United States Patent [19]

Kidd et al.

[11] Patent Number: 4,958,254

[45] Date of Patent: Sep. 18, 1990

[54] FIVE PIN PROTECTOR MODULE FOR TELEPHONE CIRCUITS

[75] Inventors: Dan Kidd, Cornish; John J. Napiorkowski, Cape Elizabeth; Bruce D. Atkinson, Sebago Lake, all of Me.

[73] Assignee: GTE Products Corp., Stamford, Conn.

[21] Appl. No.: 330,852

[22] Filed: Mar. 31, 1989

[51] Int. Cl.$^5$ .................................................. H02H 1/04

[52] U.S. Cl. ........................................ 361/119; 361/58; 361/124

[58] Field of Search ................ 361/119, 120, 124–127, 361/129; 337/28, 29, 31–33

[56] References Cited

U.S. PATENT DOCUMENTS 4,322,767 3/1982 El Hamamsey et al. ......... 361/91 X
4,730,229 3/1988 DeLuca et al. ................. 361/124 X
4,796,150 1/1989 Dickey et al. ....................... 361/119
4,851,956 7/1989 Borkowicz et al. ............ 361/117 X

*Primary Examiner*—Todd E. DeBoer
*Attorney, Agent, or Firm*—James Theodosopoulos

[57] ABSTRACT

A five pin protector module for telephone circuits comprises two input pins, two output pins and a grounding pin, all on an insulative base. The electrical current path between each input pin and its respective output pin comprises an electrically conductive arm, a current responsive assembly and an electrically conductive helical spring. The module contains a bidirectional voltage sensitive switch which prevents input voltage surges from reaching the output but, instead, conducts them to a grounding member to which the grounding pin is attached.

3 Claims, 2 Drawing Sheets

FIVE PIN PROTECTOR MODULE FOR TELEPHONE CIRCUITS

This invention concerns five pin protector modules for telephone circuits. Examples of such protector modules are shown in the following U.S. Pat Nos. 3,573,695; 3,587,021; 3,743,888; 3,849,750; 3,975,664; 4,004,192; 4,004,263; 4,057,692; 4,074,337; 4,168,515; 4,215,381; 4,307,430; 4,583,954; 4,667,272; 4,675,779; 4,692,833; 4,729,055; 4,736,269; 4,741,711; 4,796,150. In these patents, overvoltage protection is provided by spark-gap protectors, either a pair of spaced carbon electrodes or a gaseous discharge device. Electrical contact to these spark-gap protectors is established by physical contact to outside flat surfaces thereof.

In the instant invention, overvoltage protection is provided by a bidirectional voltage sensitive switch (BVSS), which is a solid state electronic device which constantly senses any voltage across it and which senses and conducts in either polarity. Moreover, the BVSS is in an encapsulated package having terminals or lead-in wires protruding therefrom for establishing electrical connection. The advantage of the BVSS is that it always closes at exactly the same voltage, whereas the prior art spark-gap protectors operate over a wide range of voltages. Furthermore the BVSS changes from open to closed at such a high rate of speed compared to a spark-gap protector that there is considerably less surge voltage overshoot for the BVSS in comparison to the spark-gap protector.

Figure 1A:
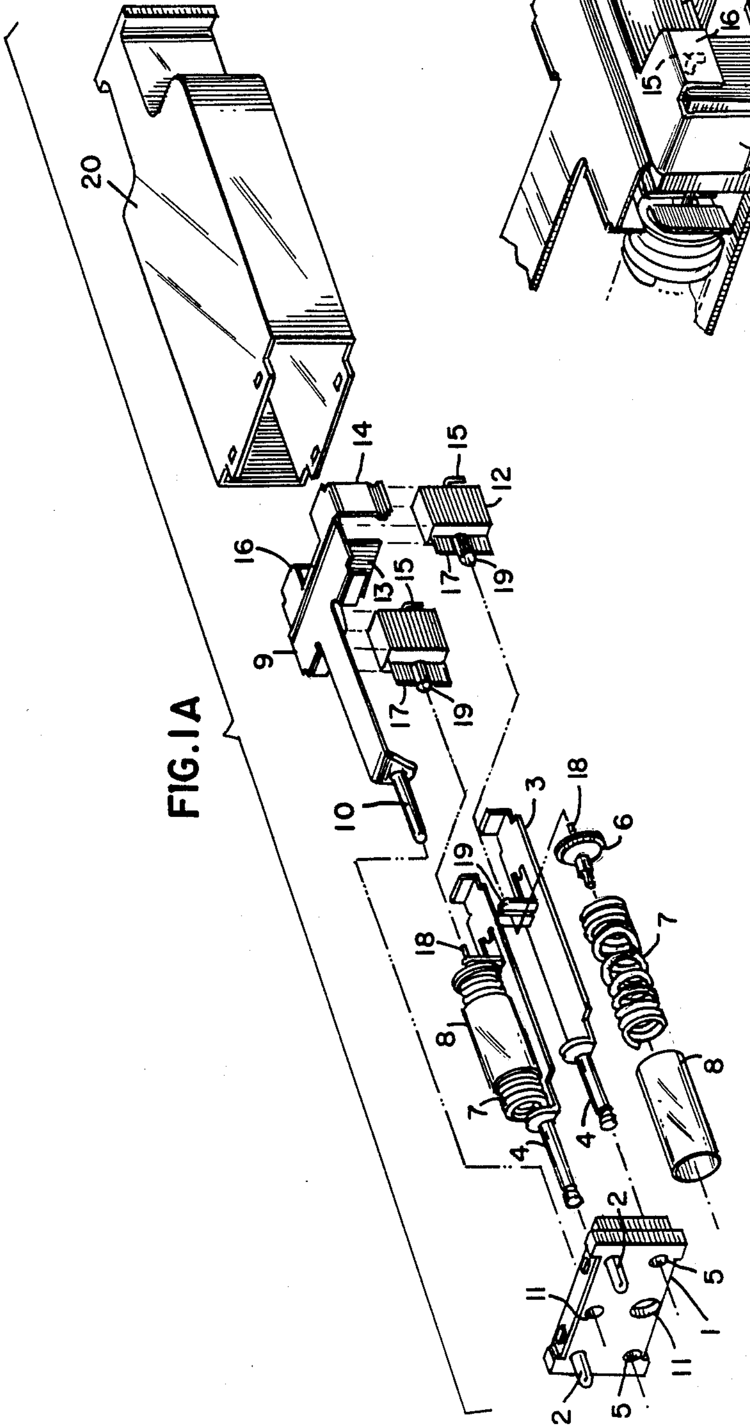
Figure 1B:
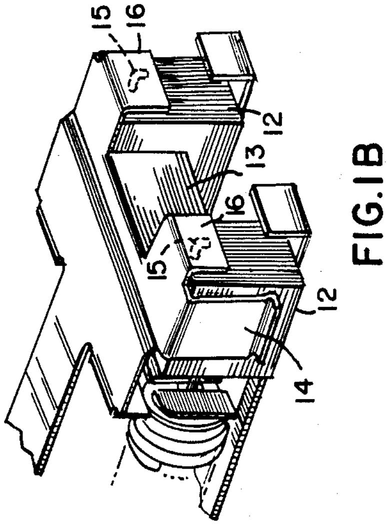
Figure 2A:
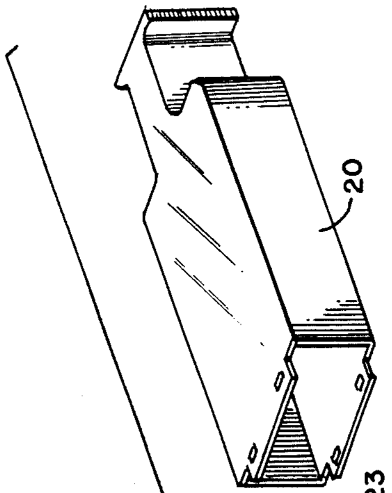

In the drawing, FIGS. 1A and 2A are exploded perspective views of two different embodiments of the invention. FIGS. 1B and 2B show the BVSS from another angle.

As shown in FIG. 1, one example of a five pin protector module in accordance with this invention comprises an insulative base 1 having two electrically conductive output pins 2 attached thereto. The protector module also contains two electrically conductive arms 3 each having an electrically conductive input pin 4 at one end. Pins 4 extend through holes 5 in base 1. Disposed on each arm 3 is a known current- and/or heat-responsive assembly 6 and an electrically conductive spring 7 which may be partially enclosed within a cylindrical plastic sleeve 8.

The protector module also contains a grounding member 9 having a grounding pin 10 at one end thereof. Grounding pin 10 extends through hole 11 in base 1. At the other end of grounding member 9 there are two BVSS switches 12 contained between an upright section 13 and two upright sections 14 of grounding member 9. Switch 12 contains terminals 15 and 17 at opposing ends. Terminal 15 is a bent lead-in wire at one end of switch 12 and is in physical and electrical contact with upright section 16 of grounding member 9. Terminal 17 is a heat sink plate at the other end of switch 12. A metal pin 18 protruding from current responsive assembly 6 is in electrical and physical contact with heat sink plate 17. Metal pin 18 fits inside a sleeve 19 attached to heat sink plate 17 which aids in properly positioning pin 18 to make orthogonal contact with, and improve heat conductivity with, the edge of heat sink plate 17.

In normal operation electrical current flow is from input pin 4 to electrically conductive arm 3 through raised tab 19 to metal pin 18 through current responsive assembly 6 to spring 7 to output pin 2. As known, current responsive assembly 6 is designed to electrically connect input pin 4 to grounding pin 10 when current responsive assembly 6 attains a predetermined temperature, say, 90° C., due either to resistive heating or to overheating of a BVSS switch.

During normal operation, switch 12 is open. However, when a surge voltage of sufficient magnitude, say, 290 volts, appears across switch 12, switch 12 closes and places metal pin 18 in electrical contact with grounding pin 10 through bent lead-in wire 15 through upright section 16 of grounding member 9. This prevents the surge voltage from reaching output pin 2.

In this example, BVSS switch 12 was RCA SURGECTOR SGT27B13 which, in its encapsulated package, measured about 343 mils by 240 mils by 140 mils thick. Thus, two such switches could be readily contained within upright sections 13 and 14 of grounding member 9 within the standard size for five pin protector modules. Thus, a standard size cover 20 could be used to contain the protector.

Figure 2A:
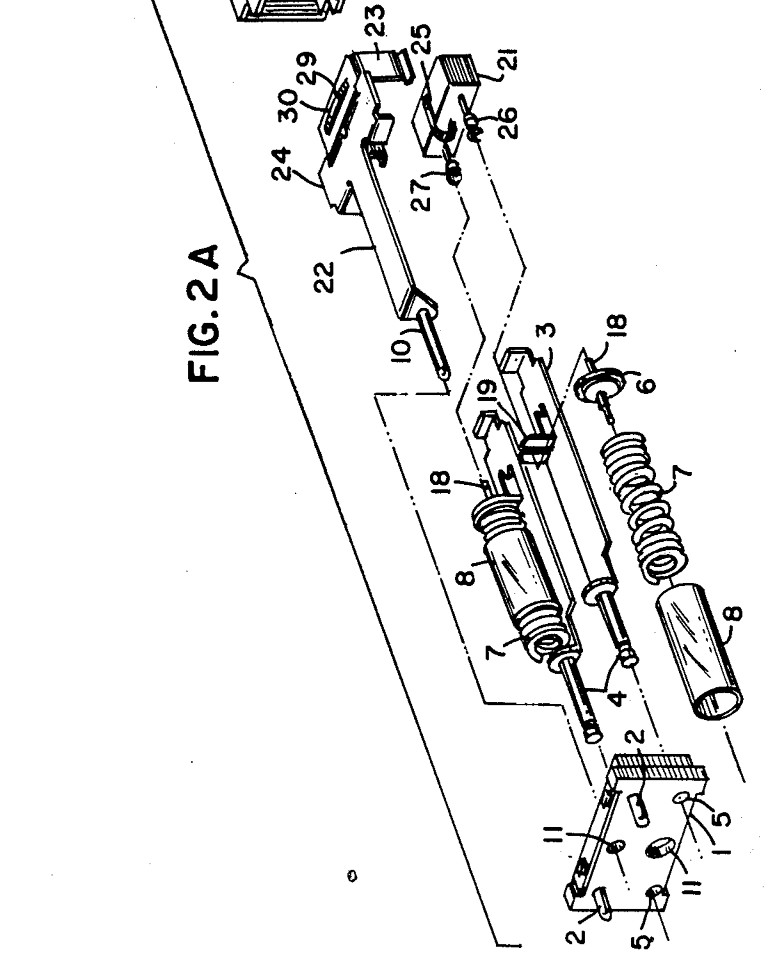
Figure 2B:
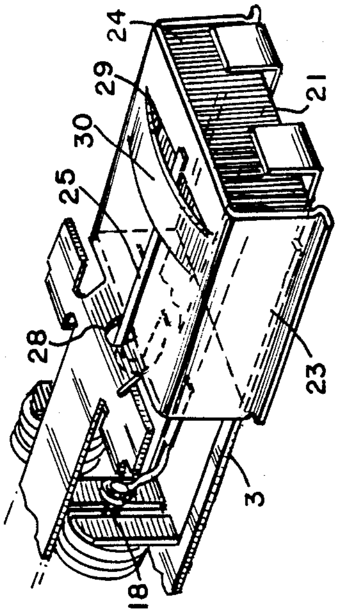

In FIG. 2, a single BVSS switch 21 is used. Thus, grounding member 22 is shaped slightly differently Switch 21 is contained between upright sections 23 and 24 of grounding member 22. Switch 21 contains two solid state circuits, one between common lead-in wire 25 and lead-in wire 26, the other between common lead-in wire 25 and lead-in wire 27. Common lead-in wire 25 is grounded to grounding member 22 by, in this example, being bent back, extending through hole 28 in grounding member 22, and being clamped in slot 29 of grounding member 22 by means of clamping finger 30. The ends of lead-in wires 26 and 27 are helically coiled so that metal pins 18 fit inside and make electrical and physical contact therewith, for optimal electrical and thermal conductivity.

In this example, switch 21 was Teccor SIDACtor P2703 AB which, in its encapsulated package, measured about 400 mils by 366 mils by 183 mils thick.

We claim:

1. A protector module for telephone circuits comprising a cover on an insulative base, the insulative base having first and second input pins, first and second output pins and a grounding pin all extending therefrom; a grounding member disposed within the cover and connected to the grounding pin; a bidirectional voltage sensitive switch (BVSS) disposed within the cover, the BVSS having a first and a second terminal protruding therefrom; an electrically conductive arm connected to the first input pin and establishing electrical connection between said first input pin and the first terminal of the BVSS; the second terminal of the BVSS being electrically connected to the grounding member; the electrical current path between the first input pin and the first output pin comprising the electrically conductive arm, a current- and/or heat-responsive assembly and an electrically conductive spring; the BVSS having a predetermined closing voltage so that a surge voltage at the first input pin exceeding said predetermined closing voltage will be conducted to the grounding pin instead of to the first output pin; the electrical current path between the first input pin and the first terminal of the BVSS including a metal pin on the current- and/or heat-responsive assembly which is in contact with said first terminal; the first terminal of the BVSS being a heat sink plate; and a sleeve being attached to the heat sink plate, the metal pin extending into the sleeve.

2. A protector module for telephone circuits comprising a cover on an insulative base, the insulative base having first and second input pins, first and second output pins and a grounding pin all extending therefrom; a grounding member disposed within the cover and connected to the grounding pin; a bidirectional voltage sensitive switch (BVSS) disposed within the cover, the BVSS having a first and a second terminal protruding therefrom; an electrically conductive arm connected to the first input pin and establishing electrical connection between said first input pin and the first terminal of the BVSS; the second terminal of the BVSS being electrically connected to the grounding member; the electrical current path between the first input pin and the first output pin comprising the electrically conductive arm, a current- and/or heat-responsive assembly and an electrically conductive spring; the BVSS having a predetermined closing voltage so that a surge voltage at the first input pin exceeding said predetermined closing voltage will be conducted to the grounding pin instead of to the first output pin; the electrical current path between the first input pin and the first terminal of the BVSS including a metal pin on the current- and/or heat-responsive assembly which is in contact with said first terminal; said first terminal of the BVSS being a lead-in wire helically coiled at its end into which the metal pin of the current- and/or heat-responsive assembly fits.

3. A protector module for telephone circuits comprising a cover on an insulative base, the insulative base having first and second input pins, first and second output pins and a grounding pin all extending therefrom; a grounding member disposed within the cover and connected top the grounding pin; a bidirectional voltage sensitive switch (BVSS) disposed within the cover, the BVSS having a first and a second and a third terminal protruding therefrom; a first electrically conductive arm connected to the first input pin and establishing electrical connection between said first input pin and the first terminal of the BVSS; the second terminal of the BVSS being electrically connected to the grounding member; the electrical current path between the first input pin and the first output pin comprising the first electrically conductive arm, a first current- and/or heat-responsive assembly and a first electrically conductive spring; a second electrically conductive arm connected to the second input pin and establishing electrical connection between said second input pin and a third terminal of the BVSS; the electrical current path between the second input pin and the second output pin comprising the second electrically conductive arm, a second current- and/or heat-responsive assembly and a second electrically conductive spring; the BVSS having a predetermined closing voltage so that a surge voltage at either input pin exceeding said predetermined closing voltage will be conducted to the grounding pin instead of to the corresponding output pin; each current- and/or heat-responsive assembly including a metal pin, the metal pin of the first current responsive assembly being in contact with the first terminal of the BVSS, the metal pin of the second current responsive assembly being in contact with the third terminal of the BVSS; the grounding member having upright sections and the BVSS being contained within said upright sections; the ends of the first and third terminals of the BVSS being helical coils and the metal pins of the current- and/or heat-responsive assemblies being inserted in said helical coils.

* * * * *